United States Patent
Grover et al.

(10) Patent No.: US 11,555,095 B2
(45) Date of Patent: Jan. 17, 2023

(54) DUAL CURE RESIN FOR THE PRODUCTION OF MOISTURE-RESISTANT ARTICLES BY ADDITIVE MANUFACTURING

(71) Applicant: Carbon, Inc., Redwood City, CA (US)

(72) Inventors: Ikpreet S. Grover, Redwood City, CA (US); Matthew S. Menyo, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/441,921

(22) PCT Filed: Mar. 16, 2020

(86) PCT No.: PCT/US2020/022883
§ 371 (c)(1),
(2) Date: Sep. 22, 2021

(87) PCT Pub. No.: WO2020/205212
PCT Pub. Date: Oct. 8, 2020

(65) Prior Publication Data
US 2022/0145019 A1    May 12, 2022

Related U.S. Application Data

(60) Provisional application No. 62/826,100, filed on Mar. 29, 2019.

(51) Int. Cl.
| | | |
|---|---|---|
| *C08L 63/00* | (2006.01) | |
| *C08J 3/24* | (2006.01) | |
| *B33Y 10/00* | (2015.01) | |
| *B33Y 70/00* | (2020.01) | |
| *B29C 64/124* | (2017.01) | |
| *B29C 64/35* | (2017.01) | |
| *B33Y 40/20* | (2020.01) | |
| *C08F 283/10* | (2006.01) | |
| *C08G 59/24* | (2006.01) | |
| *C08F 285/00* | (2006.01) | |
| *B29K 63/00* | (2006.01) | |

(52) U.S. Cl.
CPC ............ *C08J 3/243* (2013.01); *B29C 64/124* (2017.08); *B29C 64/35* (2017.08); *B33Y 10/00* (2014.12); *B33Y 40/20* (2020.01); *B33Y 70/00* (2014.12); *C08F 283/10* (2013.01); *C08F 285/00* (2013.01); *C08G 59/24* (2013.01); *B29K 2063/00* (2013.01); *C08J 2351/08* (2013.01)

(58) Field of Classification Search
CPC .... C08J 3/243; C08J 2351/08; C08J 2363/00; C08J 2433/08; B29C 64/124; B29C 64/35; B33Y 10/00; B33Y 40/20; B33Y 70/00; C08F 283/10; C08F 285/00; C08G 59/24; C08G 59/3218; C08L 63/00

USPC .......................................................... 522/110
See application file for complete search history.

(56) References Cited

U.S. PATENT DOCUMENTS

| | | |
|---|---|---|
| 3,213,058 A | 10/1965 | Boyle et al. |
| 3,386,955 A | 6/1968 | Chrobok et al. |
| 3,477,990 A | 11/1969 | Dante et al. |
| 4,283,520 A | 8/1981 | Moser et al. |
| 4,352,918 A | 10/1982 | Whiteside et al. |
| 4,436,892 A | 3/1984 | Zondler et al. |
| 4,529,821 A | 7/1985 | Stockinger et al. |
| 4,550,203 A | 10/1985 | Stockinger et al. |
| 4,587,311 A | 5/1986 | Schmid et al. |
| 4,595,219 A | 6/1986 | Lenze et al. |
| 4,618,712 A | 10/1986 | Stockinger et al. |
| 4,694,096 A | 9/1987 | Lehmann et al. |
| 4,767,832 A | 8/1988 | Marx |
| 4,859,761 A | 8/1989 | Flury et al. |
| 5,236,637 A | 8/1993 | Hull |
| 5,278,257 A | 1/1994 | Muelhaupt et al. |
| 5,391,072 A | 2/1995 | Lawton et al. |
| 5,529,473 A | 6/1996 | Lawton et al. |
| 5,599,856 A | 2/1997 | Gardner |
| 6,656,979 B1 | 12/2003 | Kitano et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,892,474 B2 | 2/2011 | Shkolnik et al. |
| 8,088,245 B2 | 1/2012 | Lutz et al. |
| 8,110,135 B2 | 2/2012 | El-Siblani |

(Continued)

FOREIGN PATENT DOCUMENTS

WO    2018165090 A1    9/2018

OTHER PUBLICATIONS

International Search Report and Written Opinion corresponding to PCT/US2020/022883; dated Jul. 8, 2020 (15 pages).
Januszewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

*Primary Examiner* — Hannah J Pak
(74) *Attorney, Agent, or Firm* — Myers Bigel, P.A.

(57) ABSTRACT

Provided herein is a dual cure resin useful for the production of objects by stereolithography, said resin comprising a mixture of: (a) a light-polymerizable component; and (b) a heat-polymerizable component, said heat-polymerizable component comprising: (i) a dicyclopentadiene-containing polyepoxide resin; (ii) a cyanate ester resin; (iii) an epoxy-reactive toughening agent; and (iv) a core shell rubber toughener.

17 Claims, No Drawings

(56) References Cited

U.S. PATENT DOCUMENTS

| | | |
|---|---|---|
| 8,258,216 B2 | 9/2012 | Qiang et al. |
| 8,632,654 B2 | 1/2014 | Walter et al. |
| 8,779,036 B2 | 7/2014 | Spyrou et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,315,698 B2 | 4/2016 | Zaffaroni et al. |
| 9,416,271 B2 | 8/2016 | Tietze et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 9,708,440 B2 | 7/2017 | Das et al. |
| 9,708,761 B2 | 7/2017 | Medoff et al. |
| 9,873,761 B1 | 1/2018 | Das et al. |
| 10,233,139 B2 | 3/2019 | Evsyukov et al. |
| 2005/0175925 A1* | 8/2005 | Johnson ............... B33Y 10/00 430/280.1 |
| 2010/0261822 A1* | 10/2010 | Jennrich ............... C08L 83/04 524/196 |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0264719 A1* | 9/2018 | Rolland ............... B33Y 30/00 |
| 2018/0290374 A1 | 10/2018 | Willis et al. |
| 2018/0304526 A1* | 10/2018 | Feller ............... B29C 64/379 |
| 2020/0122387 A1* | 4/2020 | Polidore ............. H01Q 9/0485 |

\* cited by examiner

DUAL CURE RESIN FOR THE PRODUCTION OF MOISTURE-RESISTANT ARTICLES BY ADDITIVE MANUFACTURING

CROSS-REFERENCE TO RELATED APPLICATIONS

This application is a 35 U.S.C. § 371 national phase application of International Application Serial No. PCT/US2020/022883, filed Mar. 16, 2020, which claims priority to U.S. Provisional Application Ser. No. 62/826,100, filed Mar. 29, 2019, the disclosure of which is hereby incorporated by reference in its entirety.

FIELD OF THE INVENTION

The present invention concerns resins and methods of use thereof in producing objects by additive manufacturing, particularly objects having good moisture resistance.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing See, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606. Also note Das et al., High temperature three dimensional printing compositions, U.S. Pat. No. 9,708,761.

Together, these developments have created an increased demand for additive manufacturing resins and systems that allow for the production of objects with more diverse properties.

SUMMARY OF THE INVENTION

Provided herein is a dual cure resin useful for the production of objects by stereolithography, said resin comprising a mixture of: (a) a light-polymerizable component; and (b) a heat-polymerizable component, said heat-polymerizable component comprising: (i) a dicyclopentadiene-containing polyepoxides resin; (ii) a cyanate ester resin; (iii) an epoxy-reactive toughening agent; and (iv) a core shell rubber toughener.

In some embodiments, the core shell rubber toughener comprises a polybutadiene core.

In some embodiments, the cyanate ester resin comprises a bisphenol cyanate ester (e.g., bisphenol E or bisphenol A cyanate ester).

In some embodiments, the epoxy-reactive toughening agent comprises a compound of Formula I:

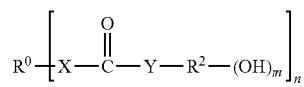

wherein:
  m is 1 or 2;
  n is 2 to 6;
  $R^0$ is an n-valent radical of an elastomeric prepolymer (e.g., after the removal of the terminal isocyanate, amino or hydroxyl groups), the elastomeric prepolymer being soluble or dispersible in epoxy resin;
  X and Y independently of one another are —O— or —$NR^3$—, at least one X or Y being —$NR^3$—;
  $R^2$ is an m+1-valent radical of polyphenol or aminophenol after the removal of the phenolic hydroxyl group(s) and optionally of the amino group; and
  $R^3$ is hydrogen, $C_1$-$C_6$ alkyl, phenyl or phenol.

In some embodiments, the light-polymerizable component comprises: (i) a light polymerizable monomer (e.g., an acrylate or methacrylate); and (ii) a photoinitiator (e.g., phenylbis(2,4,6-trimethylbenzoyl)phosphine oxide (TPO)).

In some embodiments, the dual cure resin is homogeneous.

In some embodiments, the dual cure resin is nonaqueous.

Also provided is a method of making a three-dimensional object, comprising: (a) producing an intermediate three-dimensional object from a dual cure resin as taught herein by light polymerization of said resin in an additive manufacturing process; (b) optionally cleaning said intermediate object; and then (c) heating and/or microwave irradiating said intermediate three-dimensional object to produce said three-dimensional object.

In some embodiments, the additive manufacturing process comprises bottom-up stereolithography (e.g., continuous liquid interface production).

Further provided is a three-dimensional object produced by a process as taught herein.

In some embodiments of the method or three-dimensional object, the three-dimensional object has a heat deflection temperature of from 150 or 160° C., to 200, 250, or 300° C. or more; a Notched Izod Impact Strength of at least 40 or 45 J/m, to 70 or 100 J/m or more; and/or absorbs not more than 6, 7, or 8 percent by weight of water after being immersed in deionized water at atmospheric pressure and a temperature of 85° C. for a time of eight days.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Resins.

Dual cure resins for additive manufacturing include a light reactive component and a second reactive component, typically a thermally cured component.

A. Light-polymerizable monomers and/or prepolymers. Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

Light reactive components for dual cure resin are known and described in, for example, U.S. Pat. Nos. 9,676,963, 9,453,142 and 9,598,606 to Rolland et al., the disclosures of which are incorporated herein by reference. As a non-limiting example, the light reactive component may comprise urethane acrylate or urethane methacrylate.

B. Heat-polymerizable monomers and/or prepolymers. Sometimes also referred to as "Part B," in the present invention, the thermally reactive component comprises an epoxy resin, a cyanate ester resin, and an epoxy-reactive toughening agent.

In one embodiment, the epoxy resin is a dicyclopentadiene-containing polyepoxide. Suitable examples include the epoxy resin Huntsman Tactix® 556 or 756. or Nippon Kayaku XD-1000. or a DIC HP-7200 series resin. See, e.g., U.S. Pat. No. 8,258,216 to Park Electrochemical.

"Cyanate ester resin" means a bisphenol or polyphenol, e.g. novolac, derivative, in which the hydrogen atom of the phenolic OH group is substituted by a cyano group, resulting in an —OCN group. Examples include but are not limited to bisphenol A dicyanate ester, commercially available as, e.g. Primaset® BADCy from Lonza or AroCy® B-10 from Huntsman, as well as other Primaset® or AroCy® types, e.g. bis(3,5-dimethyl-4-cyanatophenyl)methane (AroCy® M-10), 1,1-bis(4-cyanatophenyl)ethane (AroCy® L-10), 2,2-bis(4-cyanatophenyl)-1,1,1,3,3,3-hexafluoropropane (AroCy® F-10), 1,3-bis(1-(4-cyanatophenyl)-1-methylethylidene)benzene (AroCy® XU-366), di(4-cyanatophenyl) thioether (AroCy® RDX-80371; AroCy® T-10), bis(4-cyanatophenyl)dichloromethylidenemethane (AroCy® RD98-228), bis(4-cyanatophenyl)octahydro-4,7-methanoindene (AroCy® XU-71787.02L), as well as bis(4-cyanatophenyl) methane, bis(3-methyl-4-cyanatophenyl)methane, bis(3-ethyl-4-cyanatophenyl)methane, di(4-cyanatophenyl)ether, 4,4-dicyanatobiphenyl, 1,4-bis(1-(4-cyanatophenyl)-1-methylethylidene)benzene, and resorcinol dicyanate. See, e.g., U.S. Pat. No. 10,233,139 to Evonik Technochemie GmbH.

In one embodiment, the epoxy-reactive toughening agent is a compound of formula I:

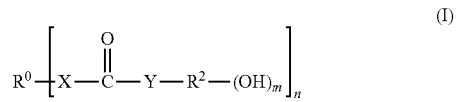

wherein:
m is 1 or 2,
n is 2 to 6,
$R^0$ is an n-valent radical of an elastomeric prepolymer (e.g., after the removal of the terminal isocyanate, amino or hydroxyl groups), the elastomeric prepolymer being soluble or dispersible in epoxy resin,
X and Y independently of one another are —O— or —$NR^3$—, at least one X or Y being —$NR^3$—,
$R^2$ is an m+1-valent radical of polyphenol or aminophenol after the removal of the phenolic hydroxyl group(s) and optionally of the amino group, and
$R^3$ is hydrogen, $C_1$-$C_6$ alkyl, phenyl or phenol (See, e.g., U.S. Pat. No. 9,416,271 to Huntsman) (and a detailed description of the toughening agent of formula (I) is given in U.S. Pat. No. 5,278,257, column 4, line 20 to column 16, line 20, the disclosure of which is incorporated herein by reference). An example of a toughening agent is Flexibilizer DY 965 (available from Huntsman Advanced Materials Americas LLC, prepared according to Example 16 of U.S. Pat. No. 5,278,257).

C. Additional resin ingredients. Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides diphenyl(2,4,6-trimethylbenzoyl)phosphine oxide, phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners. Any suitable hardener may be used as an additional component (see, e.g., U.S. Pat. Nos. 5,599,856; 6,656,979; 8,632,654; and 9,315,698). In some embodiments, the hardener can react with an epoxide. In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide; a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3,5-triazine-2,4,6-(1H,3H,5H)-trione.

In some embodiments, the hardener comprises a latent hardener (including mixtures thereof); that is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 4-aminobenzenesulfonamide, 1,2- or 1,3- or 1,4-benzenediamines, bis(4-aminophenyl)-1,4-diisopropylbenzene (e.g., EPON 1061 from Shell), bis(4-amino-3,5-dimethylphenyl)-1,4-diisopropylbenzene (e.g., EPON 1062 from Shell), bis (aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis(2,6-diethylaniline) (e.g., LONZACURE® M-DEA from Lonza), methylenebis(2-isopropyl-6-methylaniline) (e.g. LONZACURE® M-MIPA from Lonza), methylenebis(2,6-diisopropylaniline) (e.g., LONZACURE® M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2',4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis(N,N-dimethylcarbamide) (see, e.g., U.S. Pat. No. 3,386,955); and aliphatic or cycloaliphatic diamines and polyamines if they are sufficiently unreactive. An example which may be mentioned here is polyetheramines, e.g., JEFFAMINE® 230 and 400. Aliphatic or cycloaliphatic diamines or polyamines whose reactivity has been reduced by steric and/or electronic influencing factors or/and are sparingly soluble or have a high melting point, e.g., JEFFLINK® 754 (Huntsman) or CLEARLINK® 1000 (Dorf Ketal) can also be used.

Chain extenders. In some embodiments, chain extenders may include those that can react with epoxides to grow linear chains. Particular examples include, but are not limited to, dihydric phenolic compounds such as bisphenol A, bisphenol S (4,4'-sulfonyldiphenol), bisphenol K, tetrabromobisphenol A, etc. See U.S. Pat. No. 4,594,219 to Berthram et al.

Chain extender catalysts. In some embodiments, chain extender catalysts may include those that catalyze or promote the reaction of dihydric phenolic chain extenders with epoxides to grow linear chains. Examples of chain extender catalysts include, but are not limited to, onium salts, preferably phosphonium salts, and even more preferably phosphonium halides (e.g., tetrabutylphosphonium bromide, ethyl triphenylphosphonium iodide, etc.). See U.S. Pat. Nos. 4,767,832; 4,352,918; and 3,477,990, the disclosures of which are incorporated herein by reference. In some embodiments, the amount of the catalyst used may be from 0.01 to 10 percent, preferably from 0.05 to 5 percent, or from 0.1 to 2 percent, by weight of the composition.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core (e.g., polybutadiene). Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 136, Kaneka Kane Ace MX 137, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof, and those sold by Dow under the designation Parloid.

Organic diluents. Diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 6,000, 5,000, 4,000, or 3,000 centipoise at 25 degrees Centigrade. Suitable examples of diluents include, but are not limited to, N,N'-dimethylacrylamide, n-vinyl-2-pyrrolidone, n-vinyl formamide, n-vinyl caprolactam, acryloylmorpholine, and mixtures thereof (i.e., mixtures of two or more thereof). The diluent may be included in the polymerizable liquid in any suitable amount, typically from 1, 5 or 10 percent by weight, up to about 30 or 40 percent by weight, or more.

2. Methods of Use, and Products.

Techniques for producing an intermediate object, or "green" intermediate, from such resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Januszievcz et al., Layerless fabrication with continuous liquid interface production, Proc. Natl. Acad. Sci. USA 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, S Patent Application Pub. No. US 2017/0129167. B. Feller, US Pat App. Pub. No. US 2018/0243976; M. Panzer and J. Tumbleston, US Pat App Pub. No. US 2018/0126630; and K. Willis and B. Adzima, US Pat App Pub. No. US 2018/0290374.

Once the intermediate object has been formed and optionally cleaned (e.g., by wiping, blowing, spinning, washing, etc.), the object is then further cured, such as by heating. Heating may be active heating (e.g., baking in an oven, such as an electric, gas, solar oven or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

In some embodiments, the three-dimensional object produced as taught herein may have a higher heat deflection temperature (HDT) and/or toughness. For example, the object may have a heat deflection temperature of from 150 or 160° C., to 200, 250, or 300° C. or more, and/or a Notched Izod Impact Strength of at least 40 or 45 J/m, to 70 or 100 J/m or more. In some embodiments, the HDT may be tested on DMA Q800, 3 point bending, ramp rate—5° C./min, 0.455 MPa, 25° C. to 250° C. sweep, Sample Size—L=20 mm, W=10 mm, T=2 mm. In some embodiments, the Notched Izod Impact may be tested by ASTM D256, 3.2 mm thick sample.

In some embodiments, the three-dimensional object produced as taught herein may have improved moisture resistence. For example, the object may absorb not more than 6, 7, or 8 percent by weight of water after being immersed in deionized water at atmospheric pressure and a temperature of 85° C. for a time of eight days. In some embodiments, the improved moisture resistence is in addition to the higher HDT and/or toughness.

The present invention is further described in the following non-limiting examples.

Example 1 (Comparative)

Epoxy Cured with Amine

Twenty one grams of a commercially available urethane acrylate (CN983), 39 grams of a Kaneka Kane Ace® MX 153 33% concentrate core shell rubber (CSR) toughening agent in a bisphenol-A epoxy resin, 14 grams of 3,3 diamino diphenyl sulphone, and 0.84 grams of phenylbis(2,4,6-trimethylbenzoyl)phosphine oxide were mixed with 25 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cure products produced from such resins were evaluated by producing mechanical test samples in this manner, and results are given in TABLE 1 below.

TABLE 1

| MECHANICAL PROPERTIES | |
|---|---|
| Heat Deflection Temperature (Deg C.) | 130° C. |
| Water Uptake (8 days submerged at 85° C.) | 15% |
| Notched Izod Impact Strength (J/m) | 45 J/m |
| Tensile Strength at Yield (MPa) | 82 MPa |
| Elongation at Break % | 8% |
| Tensile Modulus (MPa) | 2800 MPa |

Example 2

Dicyclopentadiene Epoxy Cured with Amine

Improved Polar Fluid Resistance

Twenty one grams of a commercially available urethane acrylate (CN983), 42 grams of a dicyclopentadiene (DCDP) epoxy resin (Tactix® 556, available from Huntsman Chemical Co.), 10.5 grams of 3,3 diamino diphenyl sulphone, and 0.84 grams of phenylbis(2,4,6-trimethylbenzoyl)phosphine oxide were mixed with 25 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cure products produced from such resins were evaluated by producing mechanical test samples in this manner, and results are given in TABLE 2 below.

TABLE 2

| MECHANICAL PROPERTIES | |
|---|---|
| Heat Deflection Temperature (Deg C.) | 125° C. |
| Water Uptake (8 days submerged at 85° C.) | 7.2% |
| Notched Izod Impact Strength (J/m) | 25 J/m |
| Tensile Strength at Yield (MPa) | 95 MPa |
| Elongation at Break % | 3% |
| Tensile Modulus (MPa) | 3500 MPa |

Note that Example 1 has Bisphenol A diglycidyl ether while Example 2 has a more hydrophobic dicyclopentadiene (DCPD) based epoxy with water uptake reduced from 15% to 5% after being submerged in deionized water at a temperature of 85° C. for 8 days. Without wishing to be bound to any theory of the invention, it is believed that replacing bisphenol A diglycidyl ether backbone in the thermal polymer network with a more hydrophobic DCPD based epoxy serves to significantly improve the resistance to polar fluids.

Example 3

Epoxy Cured with Cyanate Ester

Improved Heat Deflection Temperature and Polar Fluid Resistance

Fifteen grams of a commercially available urethane acrylate (CN983), 30 grams of a dicyclopentadiene epoxy resin (Tactix® 556), 30 grams of bisphenol E cyanate ester (Arocyl L-10), and 0.84 grams of phenylbis(2,4,6-trimethylbenzoyl)phosphine oxide were mixed with 25 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cure products produced from such resins were evaluated by producing mechanical test samples in this manner, and results are given in TABLE 3 below.

TABLE 3

| MECHANICAL PROPERTIES | |
|---|---|
| Heat Deflection Temperature (Deg C.) | 175° C. |
| Water Uptake (8 days submerged at 85° C.) | 5.9% |
| Notched Izod Impact Strength (J/m) | 31 J/m |
| Tensile Strength at Yield (MPa) | 112 MPa |
| Elongation at Break % | 4.51% |
| Tensile Modulus (MPa) | 4320 MPa |

Note that Example 2 has epoxy cured with latent amine curative, while Example 3 has same epoxy cured with bisphenol E cyanate ester which leads to significant improvement in HDT from 125° C. to 175° C. Without wishing to be bound to any one theory of the invention, it is believed that the reaction of cyanate ester with epoxy leads to the formation of an oxazolidinone ring which is stable at higher temperature and helps in improving the heat distortion temperature of the complete network.

Example 4

Epoxy Cured with Cyanate Ester and Reactive Toughener

Improved Toughness, Heat Deflection Temperature, and Polar Fluid Resistance

Fifteen grams of a bisphenol A-glycidyl methacrylate with core shell rubber modifiers, 27 grams of a dicyclopentadiene epoxy resin (Tactix 556), 27 grams of bisphenol E cyanate ester (Arocyl L-10), 9 grams of phenolic terminated polyurethane based toughener (Flexiblizer DY 965, available from Huntsman) and 0.84 grams of phenylbis(2,4,6-trimethylbenzoyl)phosphine oxide were mixed with 21 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cure products produced from such resins were evaluated by producing mechanical test samples in this manner, and results are given in TABLE 4 below.

TABLE 4

| MECHANICAL PROPERTIES | |
|---|---|
| Heat Deflection Temperature (Deg C.) | 171° C. |
| Water Uptake (8 days submerged/85 C.) | 5.6% |
| Notched Izod Impact Strength (J/m) | 50 J/m |
| Tensile Strength at Yield (MPa) | 75 MPa |

TABLE 4-continued

| MECHANICAL PROPERTIES | |
|---|---|
| Elongation at Break % | 4.66% |
| Tensile Modulus (MPa) | 2980 MPa |

Note that incorporating a reactive toughening agent helps in improving the notched izod impact strength from 31 J/m to 50 J/m (Example 3 versus Example 4) without adversely affecting either the heat distortion temperature or resistance to polar fluid. The resin of Example 4 thereby provides all three characteristics of: (i) polar fluid resistance, (ii) high heat deflection temperature, and (iii) toughness.

The foregoing is illustrative of the present invention, and is not to be construed as limiting thereof. The invention is defined by the following claims, with equivalents of the claims to be included therein.

We claim:

1. A dual cure resin useful for the production of objects by stereolithography, said dual cure resin comprising a mixture of:
(a) a light-polymerizable component; and
(b) a heat-polymerizable component, said heat-polymerizable component comprising:
(i) a dicyclopentadiene-containing polyepoxide resin;
(ii) a cyanate ester resin;
(iii) an epoxy-reactive toughening agent, wherein the epoxy-reactive toughening agent comprises a compound of Formula I:

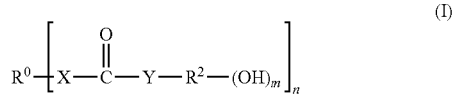

(I)

wherein
m is 1 or 2;
n is 2 to 6;
$R^0$ is an n-valent radical of an elastomeric prepolymer, the elastomeric prepolymer being soluble or dispersible in epoxy resign;
X and Y independent of one another are —O— or —NR$^3$—, at least one X or Y being —NR$^3$—;
$R^2$ is an m+1-valent radical of polyphenol or aminophenol after the removal of the phenolic hydroxyl group(s) and optionally of the amino group; and
$R^3$ is hydrogen, $C_1$-$C_6$ alkyl, phenyl or phenol; and
(iv) a core shell rubber toughener.

2. The dual cure resin of claim 1, wherein said core shell rubber toughener comprises a polybutadiene core.
3. The dual cure resin of claim 1, wherein said cyanate ester resin comprises a bisphenol cyanate ester.
4. The dual cure resin of claim 1, wherein said light-polymerizable component comprises:
(i) a light polymerizable monomer; and
(ii) a photoinitiator.
5. The dual cure resin of claim 4, wherein the light polymerizable monomer comprises an acrylate or a methacrylate.
6. The dual cure resin of claim 1, wherein said dual cure resin is homogeneous.
7. The dual cure resin of claim 1, wherein said dual cure resin is nonaqueous.
8. A method of making a three-dimensional object, comprising:
(a) producing an intermediate three-dimensional object from the dual care resin of claim 1 by light polymerization of said dual cure resin by stereolithography;
(b) optionally cleaning said intermediate three-dimensional object; and then
(c) heating and/or microwave irradiating said intermediate three-dimensional object to produce a three-dimensional object.
9. The method of claim 8, wherein said stereolithography is bottom-up stereolithography.
10. The method of claim 8, wherein said stereolithography is continuous liquid interface production.
11. The method of claim 8, said three-dimensional object having a heat deflection temperature of from 150° C to 300° C.
12. The method of claim 8, said three-dimensional object having a Notched Izod Impact Strength of at least 40 J/m to 100 J/m.
13. The method of claim 8, said three-dimensional object absorbing not more than 8 percent by weight of water after being immersed in deionized water at atmospheric pressure and a temperature of 85° C. for a time of eight days.
14. A three-dimensional object produced by the process of claim 8.
15. The dual cure resin of claim 1, wherein said cyanate ester resin comprises a bisphenol E or bisphenol A cyanate ester.
16. The dual cure resin of claim 1, wherein $R^0$ is an n-valent radical of an elastomeric prepolymer after the removal of terminal isocyanate, amino or hydroxyl groups.
17. The dual cure resin of claim 4, wherein the light polymerizable monomer comprises a urethane acrylate or methacrylate.

* * * * *

UNITED STATES PATENT AND TRADEMARK OFFICE
CERTIFICATE OF CORRECTION

| | | |
|---|---|---|
| PATENT NO. | : 11,555,095 B2 | Page 1 of 1 |
| APPLICATION NO. | : 17/441921 | |
| DATED | : January 17, 2023 | |
| INVENTOR(S) | : Grover et al. | |

It is certified that error appears in the above-identified patent and that said Letters Patent is hereby corrected as shown below:

In the Specification

Column 4, Line 18: Please correct "R°" to read --$R^0$--

Column 8, Line 5: Please correct "S Patent" to read --US Patent--

In the Claims

Column 11, Line 44, Claim 1: Please correct "resign;" to read --resin;--

Column 12, Line 18, Claim 8: Please correct "care" to read --cure--

Column 12, Line 44, Claim 16: Please correct "R°" to read --$R^0$--

Signed and Sealed this
Ninth Day of May, 2023

*Katherine Kelly Vidal*

Katherine Kelly Vidal
*Director of the United States Patent and Trademark Office*